United States Patent
Cantwell et al.

(10) Patent No.: US 10,156,647 B2
(45) Date of Patent: Dec. 18, 2018

(54) METHOD OF SPECTRAL DATA DETECTION AND MANIPULATION

(71) Applicant: Kromek Limited, Sedgefield (GB)

(72) Inventors: Benjamin John Cantwell, Sedgefield (GB); Andrew Keith Powell, Sedgefield (GB); Ian Radley, Sedgefield (GB)

(73) Assignee: Kromek Limited, Sedgefield (GB)

( * ) Notice: Subject to any disclaimer, the term of this patent is extended or adjusted under 35 U.S.C. 154(b) by 204 days.

(21) Appl. No.: 14/442,181

(22) PCT Filed: Nov. 22, 2013

(86) PCT No.: PCT/GB2013/053079
§ 371 (c)(1),
(2) Date: May 12, 2015

(87) PCT Pub. No.: WO2014/080209
PCT Pub. Date: May 30, 2014

(65) Prior Publication Data
US 2016/0061969 A1 Mar. 3, 2016

(30) Foreign Application Priority Data
Nov. 23, 2012 (GB) .................................. 1221124.9

(51) Int. Cl.
*G01T 7/00* (2006.01)
*G01T 1/36* (2006.01)

(52) U.S. Cl.
CPC ................ *G01T 7/005* (2013.01); *G01T 1/36* (2013.01)

(58) Field of Classification Search
CPC .................................. G01T 7/005; G01T 1/36
See application file for complete search history.

(56) References Cited

U.S. PATENT DOCUMENTS 8,412,468 B1 * 4/2013 Kessler ................ G01N 23/087
702/179
2012/0328312 A1 * 12/2012 Shoji .................. G03G 15/5062
399/49

(Continued)

FOREIGN PATENT DOCUMENTS

WO WO-0077676 A1 12/2000
WO WO-2004081606 A1 9/2004

OTHER PUBLICATIONS

Eberle, Katja, "International Search Report," prepared for PCT/GB2013/053079, dated Mar. 25, 2014, three pages.

(Continued)

*Primary Examiner* — Mamadou Diallo
(74) *Attorney, Agent, or Firm* — Winstead PC (57) ABSTRACT

A method is for the deconvolution of a statistically noisy spectral dataset is described comprising the steps of: a. obtaining a spectroscopically resolved dataset of measured flux from a sample that has been collected using a suitable detector radiation system; b. generating an initial estimate of the true spectrum; c. modifying the estimate of the true spectrum by a response function of the detector used to collect the measured flux dataset so as to generate an estimate flux dataset; d. computing a merit value for statistical fit between the measured flux dataset and the estimate flux dataset; e. applying a perturbation to a value of the estimate of the true spectrum; f. repeating steps c and d to the estimate of the true spectrum so changed, accepting the change to the estimate of the true spectrum if the resultant merit value indicates an improvement or if the resultant merit value indicates a deterioration of less than a limit margin, and rejecting the change to the estimate of the true spectrum if the resultant merit value indicates a deterioration of more than a limit margin; and g. repeating steps e and f for each further value of the estimate of the true spectrum to (Continued)

obtain a modified estimate of the true spectrum; h. repeating steps c to g for successive modified estimates of the true spectrum while reducing the limit margin. More completely, a method of detection of a spectrally resolved radiation dataset is described embodying the above.

15 Claims, 3 Drawing Sheets

(56) References Cited

U.S. PATENT DOCUMENTS

2015/0070528 A1* 3/2015 Kikuchi ............... H04N 9/07
                                                        348/224.1
2016/0061969 A1* 3/2016 Cantwell ............... G01T 1/36
                                                        702/191

OTHER PUBLICATIONS

Proctor, A.E., et al., "Comparison of Several Detector Technologies for Measurement of Special Nuclear Materials," National Technical Information Service, 2003, pp. 1-9.

Beach, S.M., et al., "Deconvolution and Reconstruction Techniques of Closely Spaced Low-Energy Spectra from High-Purity Germanium Spectrometry," ScienceDirect, Nuclear Instruments and Methods in Physics Research, Section A, vol. 572, Jan. 8, 2007, pp. 794-803.

Biegalski, K. M. Foltz, et al., "Performance Evaluation of Spectral Deconvolution Analysis Tool (SDAT) Software Used for Nuclear Explosion Radionuclide Measurements," Journal of Radioanalytical and Nuclear Chemistry, vol. 276, No. 2, 2008, pp. 407-413.

Fish, D.A., et al., "Blind Deconvolution by Means of the Richardson-Lucy Algorithm," J. Opt. Soc. Am. A, vol. 12, No. 1, Jan. 1995, pp. 58-74.

Gardner, Robin P., et al., "Use of an Iterative Convolution Approach for Qualitative and Quantitative Peak Analysis in Low Resolution Gamma-Ray Spectra," Nuclear Instruments and Methods in Physics Research, Section A, vol. 652, Jan. 13, 2011, pp. 544-549.

Hurtado, S., et al., "A Fitting Algorithm Based on Simulated Annealing Techniques for Efficiency Calibration of HPGe Detectors Using Different Mathematical Functions," Nuclear Instruments and Methods in Physics Research, Section A, vol. 594, Jul. 11, 2008, pp. 362-367.

Lucy, L.B., "An Iterative Technique for the Rectification of Observed Distributions," The Astronomical Journal, vol. 79, No. 6, Jun. 1974, pp. 745-754.

Richardson, William Hadley, "Bayesian-Based Iterative Method of Image Restoration," Journal of the Optical Society of America, vol. 62, No. 1, Jan. 1972, pp. 55-59.

Shevchenko, S.V., "Statistical-Test Method in Calculating the Response Function of γ-Ray Detectors," Translated from Atomnaya Énergiya, vol. 69, No. 3, Sep. 1990, pp. 184-185. Original article submitted Sep. 5, 1988.

* cited by examiner

METHOD OF SPECTRAL DATA DETECTION AND MANIPULATION

The invention relates to a method of detection of a spectral dataset and for example of a resolved radiation spectrum which is deconvolved to mitigate noise effects, and to a method of manipulation of collected spectral data and for example of a collected radiation spectrum by applying such a deconvolution.

The invention in particular in the preferred case relates to a method of detection or manipulation of a radiation spectrum that exhibits statistical noise having a continuous probability distribution such as a Poisson distribution attributable to a stochastic aspect of the process by applying a deconvolution to reconstruct a more representative true spectrum. The invention in particular in the preferred case relates to a method of detection or manipulation of a low count radiation spectrum such as a low count gamma ray spectrum from a radioactive source or contaminated sample to reconstruct a more representative true spectrum, and the invention is discussed herein in that context. However the principles of the invention may be applied to the collection or processing of any spectral data that exhibits statistical noise having a continuous probability distribution.

There is a requirement to provide accurate radiation dose measurements from a range of test samples both in the laboratory and in the field, using modern energy discriminating radiation detectors that resolve collected intensity data across the radiation spectrum, and for example into plural energy bands across the radiation spectrum. Importantly, if a total dose reading can be split into its constituent energy bands, the nature of the radioactive source components in the sample and their likely origins can also be elucidated. The accurate detection of the presence of man-made radioisotopes such as that of caesium, in soil or food samples is of particular interest. $^{137}$Cs is indicative of contamination by power production processes using nuclear fission, with this isotope being a majority fission daughter product. It can be detected from its signature 662 keV gamma ray emissions. There is an interest in accurately determining gamma ray spectra from a variety of tests samples.

To obtain accurate overall sample activity measures, it is necessary to gather statistically meaningful numbers of decay events, which can take many hours for low activity samples. This problem is exacerbated if accurate activity levels are to be obtained over discrete energy ranges in an overall gamma ray spectrum, to allow for the identification of sources from gamma ray emission peak energies. The problem then arises of how to reconstruct the gamma ray spectrum of a low activity sample with poor counting statistics.

Recently, deconvolution algorithms such as the method of Richardson and Lucy have proved successful in reconstructing gamma ray spectra from counts recorded in specific types of detector. As the incident flux is modified by the detector's instrument response, before a signal is logged, this instrument function needs to be de-convolved from the recorded signal to obtain a true measure of the incident gamma ray flux. A total dose rate can then be evaluated by weighting the de-convolved spectrum by the appropriate energy-dose factors, which can be found from tables. The instrument response function can be generated for a range of detector types, configurations and environments by direct computer simulation of the physical processes of the radiation interactions within and around the detector assembly.

Not surprisingly, it has been found that deconvolution methods require a minimum number of logged events to be successful at reconstructing a particular gamma ray spectrum; with the higher the energy of the spectral features the more recorded counts being required. Too few counts introduce spiked features towards the high energy end of the reconstructed spectrum which can cause large overestimates of perceived dose. This arises as the instrument detector response becomes smaller with increased gamma ray energy, making the high energy deconvolution ultimately prone to numerical instability with noisy data. It should be remembered that count data has to originate in the form of integer values, representing discrete logged events and that these are subject to statistical uncertainties arising from the Poisson nature of the radioactive decay process. This is exacerbated at low count rates with very small numbers of recorded events at each value of energy producing a data set which is statistically noisy.

This is the problem that is faced when attempting to determine, in the shortest possible times, the gamma ray spectra from samples of presumed low activity such as potentially contaminated food or soil samples. The invention seeks to mitigate this by applying an alternative deconvolution methodology.

In accordance with the invention in a first aspect, a method is provided for the deconvolution of a statistically noisy spectral dataset to produce a more representative true spectrum. The method is in particular a method for the deconvolution of a collected resolved radiation spectrum, and is in particular a method for the deconvolution of a radiation spectrum that exhibits statistical noise having a continuous probability distribution such as a Poisson distribution attributable to a stochastic aspect of the radiative process. The method is most preferably a method for the deconvolution of a collected low count rate gamma ray spectrum.

The method of the first aspect of the invention comprises the steps of:
a. obtaining a spectroscopically resolved dataset of measured flux from a sample for example a resolved dataset that has been collected using a suitable detector radiation system;
b. generating an initial estimate of a true spectrum;
c. operating on the estimate of the true spectrum using a response function of the detector used to collect the measured flux dataset so as to generate an estimate flux dataset;
d. computing a merit value for statistical fit between the measured flux dataset and the estimate flux dataset;
e. applying a perturbation to a value of the estimate of the true spectrum; and
f. repeating steps c and d to the estimate of the true spectrum so changed, accepting the change to the estimate of the true spectrum if the resultant merit value indicates an improvement or if the resultant merit value indicates a deterioration of less than a limit margin, and rejecting the change to the estimate of the true spectrum if the resultant merit value indicates a deterioration of more than a limit margin; the limit margin itself being for example derived from a randomly generated variable.
g. repeating steps e and f for each further value of the estimate of the true spectrum to obtain a modified estimate of the true spectrum;
h. repeating steps c to g for successive modified estimates of the true spectrum while reducing the limit margin.

The invention relies on the observation that the deconvolution of statistically noisy spectra with low count data becomes critically sensitive to small perturbations of the input data. For example in the case of radioactive decay processes it should be remembered that count data has to be in the form of integer values, representing discrete logged events and that these are subject to statistical uncertainties arising from the Poisson nature of the radioactive decay process.

By applying a perturbation such as a random, small perturbation to the numbers of recorded events at each value of energy in the recorded spectrum, for a dataset which is statistically noisy, it has been found that the deconvolution algorithm produces a number of widely differing results; ranging from seemingly faithful reproductions of the presumed source spectrum to those of severely spiked and unphysical solutions.

The merit of any of the perturbed, de-convolved reconstructions can be assessed by comparing the difference between the originally recorded data and the de-convolved spectrum after it has been re-convolved with the detector's response function to give regenerated data. This principle is employed by step d of the process as above described to generate a merit value or figure of merit for the statistical fit between the measured flux dataset and the estimate flux dataset.

The precise method of computing a figure of merit for the statistical fit between the measured flux dataset and the estimate flux dataset is not specifically pertinent to the invention, provided that it enables the comparison to be made so that if the resultant figure of merit indicates an improvement (a better statistical fit between the measured flux dataset and the estimate flux dataset than before the perturbation) or if the resultant figure of merit indicates a deterioration (a worse statistical fit between the measured flux dataset and the estimate flux dataset than before the perturbation) but of less than a limit margin, the estimate flux dataset with the perturbation is accepted; but if the resultant figure of merit indicates a deterioration of more than a limit margin the estimate flux dataset with the perturbation is rejected.

A figure merit can be based on any suitable statistical comparison technique that quantifies the difference between the measured flux dataset and the estimate flux dataset. A figure merit can be based for example upon cross-correlation, mean squared difference, Noise Power Spectrum or any similar such statistical comparison technique and may include a factor that compares the total number of events present in each of the functions. A typical plot of such a merit function for a number of perturbed files may be expected to show a band of values with outlying high valued and low valued elements. These outlying elements represent faithful or worst case spectral reconstructions of the perturbed recorded data and provide a basis for selecting the optimal de-convolution spectrum, from which accurate activity levels or dose rates can then be determined for the sample being tested.

The above enhanced de-convolution process is re-cast in accordance with the invention as a procedure to iteratively approach a more representative de-convolved spectrum for the recorded data. The method involves perturbing a guessed true spectrum for the sample and comparing the result of this modified guessed true spectrum, after having been convolved with the detector response function to produce a guessed flux, to that of the recorded flux data, to give a figure of merit that quantifies the difference between the measured flux and the guessed flux as calculated for example in one of the ways described above.

The initial guessed spectrum, in a first instance, could be derived from the recorded data, having been scaled appropriately, generated at random, derived from the first few iterations of a Richardson-Lucy type algorithm acting upon the recorded data, or otherwise produced.

The invention is applied to a spectroscopically resolved spectrum in which count data is resolved into values for each of a plurality of energy bands or bins. The value of each of the energy bins of the guessed spectrum is perturbed, in turn, in a random way but with a predetermined maximum magnitude. The maximum magnitude may for example be scaled as a function of the expected level of noise in the value.

Those perturbations that produce an improved figure of merit, or that produce deterioration within the bounds of a limit margin, are all accepted as changes to the original guessed spectrum, all others being rejected.

The limit margin imposes a randomly derived acceptance criteria parameter for deterioration in the figure of merit that can still be accepted. The process is performed successively and iteratively by repeating steps c to g for successive modified estimates of the true spectrum while reducing the bounds of the limit margin acceptance criteria parameter for successive calculation cycles. The limit margin acceptance criteria parameter preferably reduces with each calculation cycle, and for example in the most preferred case approaches zero, tightening the acceptance criteria such that changes that represent only an improvement a progressively smaller deterioration in the figure of merit that can still be accepted, for example in the preferred case to a point whereby only improvements to the merit figure will be accepted. Successive iterations thus tend to produce successive modified estimates of the spectrum that approach the true spectrum. The rate of change of the acceptance criteria can be derived from an iteration counter. A fast protocol or schedule can be selected for computational speed or a slower schedule can be selected for accuracy. In all test cases the reduction in acceptance criteria at a rate proportional to 1/(iteration count) has achieved indistinguishable results from that of the theoretically ideal of 1/Log(iteration counts). More sophisticated adaptive schedules can be easily devised to optimise overall results on larger data sets.

The limit margin is preferably calculated numerically, for example as the output of a calculated statistical test, which is for example a calculated statistical test that is a function of and for example scaled by the noise of the signal. The statistical test is in the preferred case based on a stochastic simulation procedure, whereby the acceptance criteria are reduced as the algorithm progresses. This type of method produces the best results but can be computationally expensive. However, the amount of data may be kept relatively small (for example even in one possible simplest embodiment the data may be one dimensional although plural dimensions are not excluded) and speed is not perceived as being problematic. Alternative methods including those of genetic algorithms, projection onto convex sets methods (sympletic methods) or that of graduated non-convexity would be particularly well suited to this task, were execution speed ever to become an issue.

Although this invention refers to a one dimensional problem of restoring a radiation spectrum, the technique is not limited here. The detector response function can be extended to include environmental parameters such as the detectors spectral response dependence on temperature. In such a case the generated true spectrum would automatically be compensated for temperature effects of the detector physics and its attendant electronics. Compensation for count rate effects and other detector/electronic nonuniformities arising could also be realised such as pulse pile up may also be treated in this way.

The method of the invention can be both compared and contrasted with prior art methods that attempt to apply a deconvolution to the measured spectrum, for example using a Bayesian method, with the measured spectrum as a prior. Such methods use the measured spectrum as the starting point and apply the detector response function to attempt to deconvolve a true spectrum. By contrast, the method of the invention starts with an estimate of the true spectrum, which may be entirely arbitrary, and iteratively modifies this estimate of the true spectrum in a manner that ensures if progressively approaches a better approximation of the true spectrum.

From this analysis of the recorded data, and the regenerated data derived from the convolution of the estimated spectrum with the detector response function, the method is able to smooth out the statistical uncertainties of the recorded data to give a better approximation of the true spectrum. It should be noted too that the method also potentially restores values for the low energy region of the spectrum as these are usually lost due to the presence of electronic noise.

The method in a more complete second aspect of the invention comprises a method of detection of a spectral dataset and for example of a resolved radiation spectrum comprising the steps of:

placing a radiation detector system into suitable proximity with a test object: collecting radiation data emergent from the test object at the detector;

resolving the radiation collected at the detector spectroscopically into a resolved dataset of measured flux at a plurality of energy bands;

performing the method of the first aspect of the invention on the spectroscopically resolved dataset of measured flux so obtained.

In accordance with the principles of the second aspect of the invention there is a step of resolving the radiation collected at the detector spectroscopically into a resolved dataset of measured flux at a plurality of energy bands which is preferably performed by the detector and as a result of an inherent spectroscopic resolution of the detector. Preferably data is resolved spectroscopically into a resolved dataset of measured flux at at least three energy bands. In many instances a larger plurality of bands will be desired, for example at five, and for example 150-300 or more.

The method of the second aspect is thus a method of collection of radiation data which is then deconvolved in accordance with the method of the first aspect, and preferred features of the two aspects of the invention will be understood accordingly by analogy.

The detector system for use with the method of the second aspect of the invention, or to generate the spectrum to be processed in the first aspect of the invention, is adapted to detect incident radiation in spectroscopically resolved manner in plural separate energy bands in the sense that it is adapted to differentiate incident radiation simultaneously into plural separate energy bands and preferably at least three such energy bands across the expected detection spectrum. For example, the detector exhibits a spectroscopically variable response across at least a part of the expected detection spectrum allowing such simultaneous differentiation of incident radiation into plural energy bands.

The radiation to be detected in the second aspect of the invention, or the spectrum to be processed in the first aspect of the invention, is for example high-energy radiation such as ionizing radiation, for example high energy electromagnetic radiation such as x-rays and/or gamma rays, or subatomic particle radiation, and the detector is adapted correspondingly to detect radiation in this spectrum. The radiation to be detected in the second aspect of the invention, or the spectrum to be processed in the first aspect of the invention, is for example from a radioactive source, and is for example a gamma ray spectrum. The invention is particularly applicable to a method of detection or manipulation of a low count radiation spectrum such as a low count gamma ray spectrum from a radioactive source or from a sample such as a soil or food sample contaminated by radioactive contaminant.

A particular advantage of the method of the invention is that it allows the identification of the nature of the radioactive source components in such a measured spectrum. This may also allow the likely origins of those radioactive components to be elucidated. This may in particular be the case where it is desired to identify particular contaminants, such as 137-caesium, which is indicative of contamination by power production processes using nuclear fission.

Thus, in the preferred case, the method comprises a method of examination of an object or environment, and for example a sample from such an object or environment, which is suspected to be contaminated with undesired radioactive contaminant, and in particular the method comprises a method of identification of particular radioactive species within the radioactive contaminant.

The method of the second aspect of the invention thus in particular comprises a method for the detection of contamination of an object or environment by radiation comprising the particular steps of:

collecting incident radiation at a detector in such manner that the incident radiation is spectroscopically resolved into plural separate energy bands, for example by:

bringing a suitable radiation detector system into an environment to be tested and/or into proximity with an object to be tested and/or by bringing a sample from an object or environment to be tested into proximity with a suitable radiation detector system, and collecting incident radiation at the detector for a suitable time period.

The detector for use with the method of the second aspect of the invention, or to generate the spectrum to be processed in the first aspect of the invention, preferably exhibits a spectroscopically variable response across at least a part of this spectrum allowing spectroscopic information to be retrieved and allowing incident radiation information to be detected simultaneously at a plurality of differentiated energy bands. Preferably incident radiation data is resolved spectroscopically between at least three energy bands simultaneously.

A suitable detector for implementation of the invention comprises one or more detector elements of a semiconductor material adapted for high energy physics applications, such as a material able to act as a detector for high energy radiation, and for example high energy electromagnetic radiation such as x-rays or gamma rays, or subatomic particle radiation. The resultant detector element comprises at least one layer of such material and is thus a device adapted for high energy physics applications, and for example a detector for high energy radiation such as x-rays or gamma rays, or subatomic particle radiation.

In accordance with the invention, collected data is resolved spectroscopically across at least two and preferably at least three and for example many energy bands within the spectrum of the source. The semiconductor material of at least one of the detector elements is preferably a material adapted to exhibit a spectroscopically variable response across at least a substantial part of the intended radiation spectrum in use. In particular a semiconductor material is used that exhibits inherently as a direct material property a direct variable electrical and for example photoelectric response to different parts of the radiation spectrum in use.

In a preferred embodiment the semiconductor material is formed as a bulk crystal, and for example as a bulk single crystal (where bulk crystal in this context indicates a thickness of at least 500 µm, and preferably of at least 1 mm).

In a preferred embodiment the semiconductor material may be selected from Group II-VI semiconductors and in particular may be selected from cadmium telluride, cadmium zinc telluride (CZT), cadmium manganese telluride (CMT), and alloys thereof, and for example, save for incidental impurities, consists essentially of crystalline $Cd_{1-(a+b)}Mn_aZn_bTe$ where $a+b<1$ and a and/or b may be zero. A detector may also have other detector elements of other materials for additional functionality.

The method of the invention for example makes possible the use of CZT type detectors for back-scattering measurements, where the low energy region contains a significant fraction of the information sought. Firstly, by ignoring the low energy region of the response matrix, a best fit spectrum can be determined by the new method. This restored spectrum is then offered to a RL de-convolution algorithm utilising the entire response matrix for the detector, to give a most likely spectrum now including low energy values. A RL de-convolution algorithm can also be used prior to the stochastic optimisation algorithm providing a good initial starting point for the algorithm for more rapid results. In all cases where the restored spectrum has been loaded in to a RL de-convolution routine, unphysical spiked features have been re-introduced, except in the case where zero valued spectral bin values have been maintained and for which the RL algorithm has no means of modifying them. In this case, the RL algorithm does little modification to the already restored spectrum but can be used to re-introduce values for the lowest energy regions.

The method of the invention is equally, if not more applicable to the optimising of signals derived from hybrid detector systems. That is to say, the method of the invention may be applied to detector systems comprising a plurality of radiation detectors of at least two different types/having at least two different response properties, and in particular from a plurality of radiation detectors having at least two different energy resolutions and/or of different efficiency. It provides the optimum way of processing the signals from two (or more) sources to accurately reflect the flux that gave rise to the recorded signals, through physically separate and differing channel responses.

An example method of implementation of the invention is described below with reference to FIGS. 1 to 3 of the accompanying drawings in which.

An example process summary embodying the de-convolution principles of the invention is discussed below. Preferred numerical methods are considered for each step of the process. It will be appreciated that each of these is independently an example of a preferred implementation of a particular step of the process, and that these preferred implementations could be used in any suitable combination in the implementation of a complete process in accordance with the invention.

The example is discussed herein in the context of detection or manipulation of a low count gamma ray spectrum from a radioactive source or contaminated sample to reconstruct a more representative true spectrum. However the principles of the invention may be applied to the collection or processing of any spectral data that exhibits statistical noise having a continuous probability distribution.

A suitable example process follows.

1. Guess a gamma ray test spectrum for the low activity source. This can be random in nature or derived from the recorded events.
2. Multiply the above guessed spectrum by the detector's response function to estimate what would have been the recorded events. The guessed spectrum will be in a 1D vector, each element representing a guessed flux in an energy range. The detector response will be a matrix.
3. A numerical merit function (or fitness function) is computed between the recorded flux and that computed in 2. For this example we cite a mean squared difference that also takes in to account the difference in total flux as well as the spectral shape as that merit function and which has to be minimised.
4. The values in the vector of the guessed spectrum are perturbed in turn, by a random amount. The maximum of this amount is scaled by the perceived level of noise in the value and a maximum change that could be required overall.
5. As each guess is made, a new figure of merit is computed as in 3. If this is an improvement, then the change is accepted and the process advances on to another energy bin in the guessed spectrum. The change is otherwise decided on a Maxwell-Boltzmann probability distribution basis. The size of the deterioration in the merit function, scaled by a control parameter referred to as the "temperature" is used to obtain a probability from the MB distribution. This resulting probability is then compared to a generated random number in the range of 0 to 1. If the calculated probability is greater than this random number, the change is accepted as the deterioration is deemed to have fallen within prescribed statistical limits; otherwise the change to the spectrum is rejected.
6. The algorithm visits each energy bin value of the test spectrum in turn, many times over, before the process is repeated with a reduced temperature as in the schedule of 5. The number of times each energy bin value is visited must make it possible for sufficient total change to be made based on a random walk in 1D. As the algorithm advances, the temperature parameter is reduced, tightening the acceptance criteria to changes to a point whereby only improvements to the merit figure will be accepted. This makes possible a globally optimum solution to the optimisation problem.

7. The best guessed spectrum is obtained when no further changes can be made or when such changes are having a minimal effect, after a suitable temperature reduction cycle of step 6.
8. The restored spectrum may be used as a starting guess for a RL type de-convolution algorithm or vice-versa. It is possible that this combination might make for more accurate determinations of total activity levels.

Figure 1:
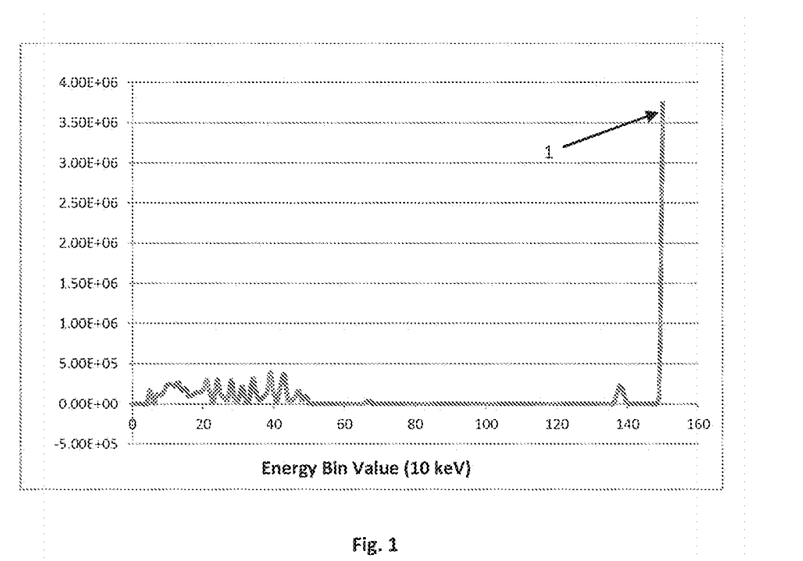
FIG. 1 is a graphical illustration of the failure of a conventional RA algorithm to de-convolve low 137-caesium count data.

The modelled response of the detector may include, in addition to energy sensitivity to incident radiation, a sensitivity to environmental factors including temperature. The method then becomes entirely suitable for the deconvolution of detector temperature effects (or other determinable non-uniformities) simultaneously to its radiation energy dependencies Referring by way of illustration to the figures, FIG. 1 shows the problem, illustrating the failure of the RA (Richardson-Lucy derived) algorithm to de-convolve data from a contaminated food sample contaminated by $^{137}$Cs producing low count data. In the illustrated graph of the RA algorithm deconvolution an erroneous spiked high energy 1 results from deconvolution with relatively few counts.

Figure 2:
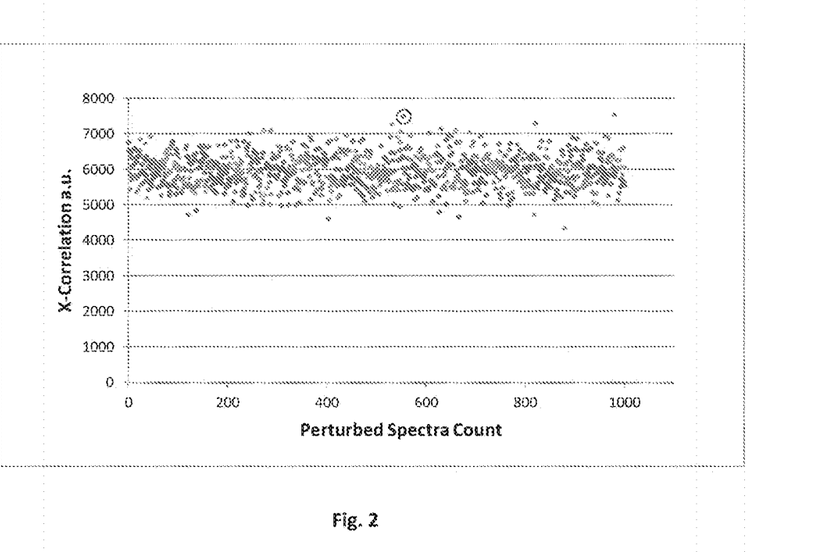
FIG. 2 shows X-correlation of measured and regenerated data.
Figure 3:
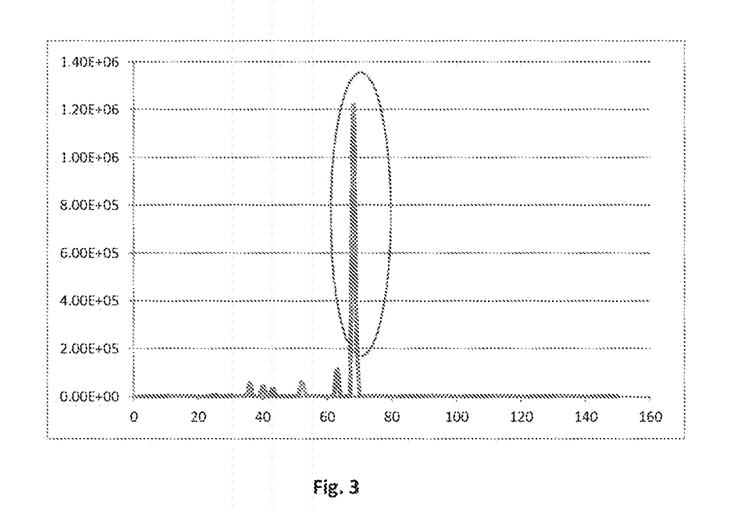
FIG. 3 shows de-convolution options from perturbed input datasets.

FIG. 2 shows X-correlation of measured and regenerated data. FIG. 3 shows de-convolution options from perturbed input data sets (1000). High autocorrelation value gives valid de-convolution result using RA algorithm. The preferred deconvolution is circled.

Figure 4:
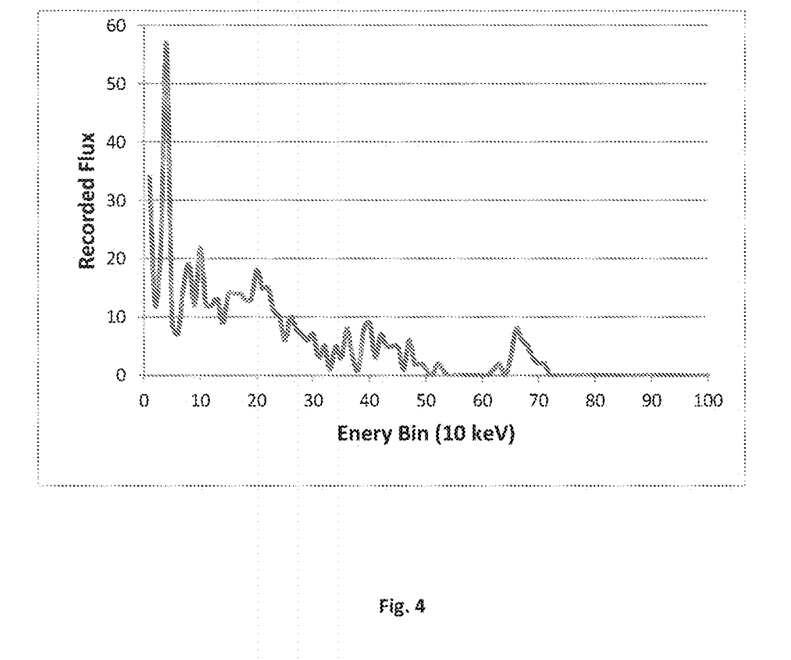
FIGS. 4 to 6 show the result of a de-convolution applied in accordance with the principles of the invention.
Figure 5:
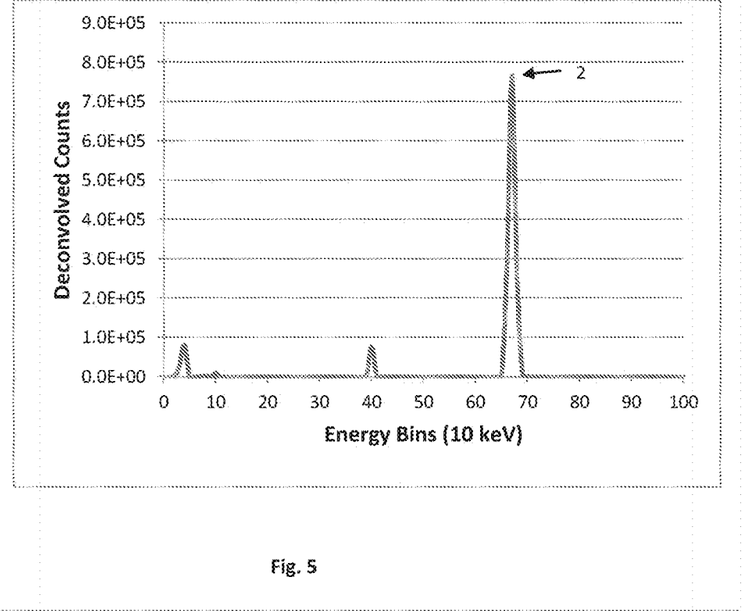
Figure 6:
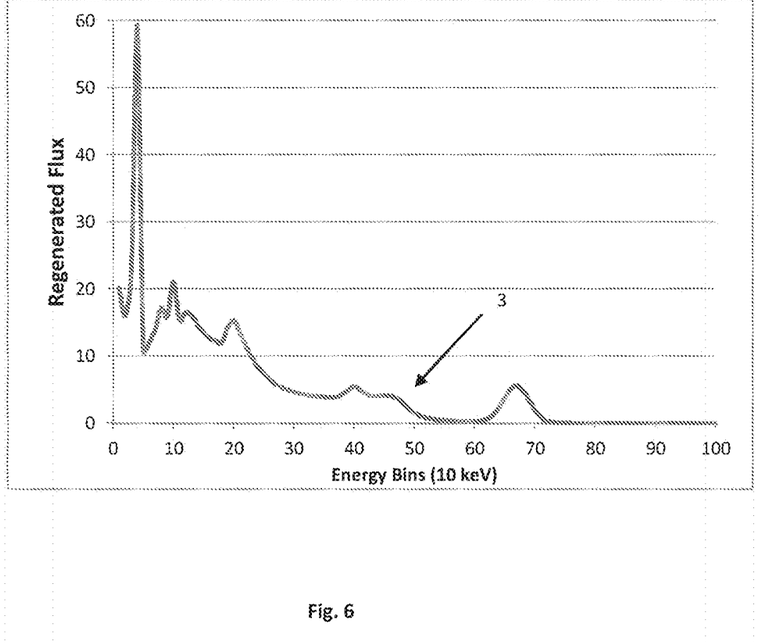

FIGS. 4 to 6 show example results from the implementation of the invention, respectively a measured spectrum, a stochastic deconvolution and a generated response (smoothed). Data is shown for 4 hour food contamination measurement of 100 Bq. Results: 91 Bq. in peak; 104 Bq. totals. In the stochastic search deconvolution of FIG. 5 a restored photopeak, 2, at 662 keV can be seen. The denoised regenerated flux plot of FIG. 6 shows a more evident Compton edge 3.

The stochastic optimisation of de-convolved gamma ray spectra appears to be a robust, optimal way of dealing with low count statistics in such measurements.

The invention claimed is:

1. An improved method of performing deconvolution for image-restoration using techniques of reconstructing statistically noisy images via blind and semiblind deconvolution for resolving radiation emission tomography imaging problems and statistical fluctuations in a sample via an iterative process of a spectroscopic physical measurement of a source spectrum perturbed by introducing a detector-response function, unique to a measurement apparatus, into a measured spectrum the improved method comprising:
   a. obtaining a spectroscopically resolved dataset of measured flux from a radiation sample that has been collected using a suitable radiation detector system in which count data is resolved into values for each of a plurality of energy bands;
   b. generating an initial estimate of a true spectrum in which count data is resolved into values for each of the plurality of energy bands;
   c. operating on the estimate of the true spectrum using a response function of the detector used to collect the measured flux dataset so as to generate an estimate flux dataset;
   d. computing a merit value for statistical fit between the measured flux dataset and the estimate flux dataset;
   e. applying a perturbation to the value of each of the energy bands of the estimate of the true spectrum;
   f. repeating steps c and d to the estimate of the true spectrum changed by the applying a perturbation step in accordance with step e, accepting the change to the estimate of the true spectrum if the resultant merit value indicates an improvement or if the resultant merit value indicates a deterioration of less than a limit margin, and rejecting the change to the estimate of the true spectrum if the resultant merit value indicates a deterioration of more than a limit margin;
   g. repeating steps e and f for each further value of the estimate of the true spectrum to obtain a modified estimate of the true spectrum;
   h. repeating steps c to g for successive modified estimates of the true spectrum while reducing the limit margin; and
   i. wherein the improved method results in resolution of the statistically noisy images and an improved representative true spectrum.

2. The improved method in accordance with claim 1 applied to collected data, wherein the measured flux exhibits statistical noise having a continuous probability distribution attributable to a stochastic aspect of the process of its generation.

3. The improved method in accordance with claim 2 applied to collected data from a radioactive decay process that exhibits statistical noise having a Poisson distribution attributable to a stochastic aspect of the decay process.

4. The improved method in accordance claim 1, wherein the step of computing a merit value for the statistical fit between the measured flux dataset and the estimate flux dataset comprises a statistical comparison technique that quantifies the difference between the measured flux dataset and the estimate flux dataset, wherein the comparison technique is based upon cross-correlation, mean squared difference, Noise Power Spectrum or any similar such statistical comparison function.

5. The improved method in accordance with claim 4, wherein the comparison technique includes a factor that compares the total number of events present in each of the datasets.

6. The improved method in accordance with claim 1, wherein a perturbation applied in step e is randomly generated but with a predetermined maximum magnitude and the maximum magnitude is scaled as a function of the expected level of noise in the value.

7. The improved method in accordance with claim 1, wherein the limit margin reduces with each calculation cycle to approach zero.

8. The improved method in accordance with claim 1, wherein the limit margin is a numerically calculated statistical test that is a function of the noise of the signal.

9. The improved method in accordance with claim 8, wherein the statistical test is based on a stochastic simulation procedure, whereby the acceptance criteria are reduced as the algorithm progresses.

10. An improved method of performing detection of a spectrally resolved radiation dataset for improved image-restoration using the techniques of reconstructing statistically noisy images via blind and semiblind deconvolution for resolving radiation emission tomography imaging problems and statistical fluctuations in a sample via an iterative process of a spectroscopic physical measurement of a source spectrum perturbed by introducing a detector-response function, unique to a measurement apparatus, into a measured spectrum, the improved method comprising:
   placing a radiation detector system into suitable proximity with a test object;
   collecting radiation data emergent from the test object at the detector;

resolving the radiation collected at the detector spectroscopically into a resolved dataset of measured flux at a plurality of energy bands, wherein such resolving is performed by the detector and as a result of an inherent spectroscopic resolution of the detector;

performing the method of claim 1 on the spectroscopically resolved dataset of measured flux; and wherein the improved method results in resolution of the statistically noisy images and an improved representative true spectrum.

11. The improved method in accordance with claim 10 used as a method of examination of an object or environment which is suspected to be contaminated with undesired radioactive contaminant to detect the presence of such radioactive contaminant.

12. The improved method for performing the detection of contamination of an object or environment by radiation comprising applying the improved method of claim 10 to include the particular steps of:

collecting incident radiation at a detector in such manner that the incident radiation is spectroscopically resolved into plural separate energy bands, further comprising introducing a suitable radiation detector system into one or more of (a) an environment to be tested, (b) proximity with an object to be tested, and (c) a sample from an object or environment to be tested into proximity with a suitable radiation detector system, and collecting incident radiation at the detector for a suitable time period.

13. The improved method in accordance with claim 1, wherein the incident radiation is high energy electromagnetic radiation of at least one or more of x-rays, gamma rays, and subatomic particle radiation.

14. The improved method in accordance with claim 12, wherein the detector system comprises one or more detector elements of a semiconductor material adapted to act as a detector for high energy electromagnetic radiation such as x-rays or gamma rays, or subatomic particle radiation, wherein at least one of the detector elements is a material adapted to exhibit a spectroscopically variable response across at least a substantial part of the intended radiation spectrum in use in that the material adapted to exhibit inherently as a direct material property a direct variable photoelectric response to different parts of the radiation spectrum in use.

15. The improved method in accordance with claim 14, wherein the semiconductor material, except for incidental impurities, consists essentially of crystalline $Cd_{1-(a+b)}Mn_aZn_b Te$ where $a+b<1$ and at least one of a and b is zero.

* * * * *